United States Patent [19]

Liautaud

[11] 4,268,003

[45] May 19, 1981

[54] MOLD CORE AND METHOD AND APPARATUS FOR MANUFACTURE

[76] Inventor: James P. Liautaud, River Bluff Rd., Trout Valley, Cary, Ill. 60013

[21] Appl. No.: 66,619

[22] Filed: Aug. 14, 1979

Related U.S. Application Data

[60] Continuation of Ser. No. 847,950, Nov. 2, 1977, abandoned, which is a division of Ser. No. 736,323, Oct. 28, 1976, Pat. No. 4,075,273, which is a division of Ser. No. 676,682, Apr. 14, 1976, abandoned.

[51] Int. Cl.³ .................... B28B 7/16; B28B 1/24; B29F 1/00; A23P 1/00
[52] U.S. Cl. .................... 249/142; 264/328.8; 425/555; 425/DIG. 10
[58] Field of Search .............. 29/428; 264/250, 328.8, 264/271, 318; 249/63, 142; 425/555, DIG. 10

[56] References Cited

U.S. PATENT DOCUMENTS

| | | | |
|---|---|---|---|
| 1,580,485 | 4/1926 | Hahn | 249/142 X |
| 2,378,586 | 6/1945 | Schultz | 249/142 X |
| 2,544,140 | 3/1951 | Dafsen et al. | 264/328.8 X |
| 2,583,441 | 1/1952 | Palmer | 264/318 X |
| 2,631,333 | 3/1953 | Brown | 264/318 X |
| 2,783,502 | 3/1957 | Abplanalp | 249/142 X |
| 2,873,482 | 2/1959 | Bridge et al. | 264/271 UX |
| 3,044,127 | 7/1962 | Alden | 264/328.8 X |
| 3,923,949 | 12/1975 | Kane | 264/318 X |

FOREIGN PATENT DOCUMENTS

1279871 11/1961 France .................... 264/328.8

Primary Examiner—Charlie T. Moon
Attorney, Agent, or Firm—Lockwood, Dewey, Alex & Cummings

[57] ABSTRACT

A precision injection-molded form for an inductance coil comprises a cylindrical core member having a surface of relatively low dimensional precision, and a thin plastic layer molded over the surface to provide a surface of high dimensional precision for supporting the windings of the coil. Metal insert-members having threaded axial bores and radially-extending wing portions are provided at either end of the core to establish electrical contact with the winding and a mounting capability for the assembly. The coil form is formed by injection molding techniques and apparatus which provide for axial compression of the assembly prior to molding to obtain a predetermined longitudinal dimension, and for equalization of forces exerted during molding to prevent longitudinal deformation.

10 Claims, 17 Drawing Figures

MOLD CORE AND METHOD AND APPARATUS FOR MANUFACTURE

This is a continuation, of application Ser. No. 847,950, now abandoned, filed Nov. 2, 1977, which is a division of application Ser. No. 736,323, filed Oct. 28, 1976, now U.S. Pat. No. 4,075,273, issued Feb. 21, 1978, which is a division of application Ser. No. 676,682, filed Apr. 14, 1976, now abandoned.

BACKGROUND OF THE INVENTION

This invention relates generally to coil forms, and more particularly to coil forms having winding surfaces of high dimensional accuracy, and a method and apparatus for the manufacture thereof.

In manufacturing certain types of electronic equipment such as radio frequency transmitters and receivers the need exists for inductance coils which can be economically manufactured in large quantities with consistent and predictable electrical characteristics. This is particularly true with coils which are self-resonant at RF frequencies, such as those used in antenna tuning applications, wherein the distributed capacitance of the coil is relied on to form a resonant circuit and no variable tuning means are provided.

While injection molding techniques allow forms for such coils to be produced at greatly reduced cost, the technique has been generally successful only for coils having a very small diameter; i.e. approximately 0.5 inch or less. For coil forms of larger sizes, e.g., from approximately 0.5 to 3 or more inches in diameter, the uneven shrinkage of the plastic following the molding operation has prevented the formation of a surface capable of supporting and positioning windings with the necessary precision to insure a consistent and predictable self-resonant frequency. The problem is compounded in applications such as the aforementioned antenna tuning application wherein the coil form must, in addition to being dimensionally accurate, be capable of withstanding extreme temperature variations and repeated mechanical stresses.

In his copending application, Ser. No. 639,421, filed Dec. 10, 1975, applicant describes a coil form which overcomes the above drawbacks by providing a cylindrical core member molded of a solid mass of plastic or similar material, and a thin plastic over-layer molded over the core for supporting the windings of the coil assembly. Since only the thin over-layer is subject to shrinkage during formation of the winding support surface, and not the greater core diameter, the net dimensional variation in the winding support surface of the completed coil form is very small.

The present invention is directed to improvements in this coil form, and to a method and apparatus for economically manufacturing the coil form for high volume applications.

It is therefore an object of the present invention to provide a new and improved injection-molded coil form having a precision winding support surface.

It is another object of the present invention to provide a new and improved injection-molded coil form having integral means for establishing electrical connection to an inductance coil wound thereon.

It is another object of the present invention to provide a new and improved method for economically manufacturing the coil form of the invention.

It is another object of the present invention to provide a new and improved method for manufacturing the coil form of the invention with improved dimensional accuracy.

It is another object of the present invention to provide a new and improved apparatus for manufacturing a coil form in accordance with the invention.

SUMMARY OF THE INVENTION

The invention is directed to an injection-molded coil form having a precision surface for supporting an inductance winding. The coil form comprises a generally cylindrical core member including a longitudinally-extending channel and a communicating axially-aligned bore at one end. A contact member including a connector portion extending into the bore and a tap portion projecting radially from the core member is seated in the channel. A pair of electrically conductive end fittings are secured to respective ends of the core member. One of these end fittings includes a central bore communicating with the axially-aligned bore in the core to form in conjunction with the connector portion of the contact member electrical connection means for the winding. A thin plastic over-layer is molded over the core member for supporting the inductance winding. The tap portion of the contact member projects through the over-layer for connection to the winding.

The invention is further directed to apparatus for molding a coil form of the type having a cylindrical core member, a pair of end fittings at either end of the core member, and a thin plastic over-layer on the core member forming a precision winding support surface. The apparatus comprises a mold loading jig for supporting the core member with the end fittings attached in axial alignment at either end thereof, and a mold including a cavity having an inside surface corresponding to the winding support surface, the cavity including registration means for the mold loading jig. Compression means are provided in the cavity for axially compressing the core assembly to a predetermined longitudinal dimension. Also provided are injection means for injecting plastic into the cavity to form the winding support layer, and ejection means for ejecting the coil form from the cavity following the molding operation.

The invention is further directed to a method of forming an injection-molded coil form having a winding support surface of precise dimensions. The method includes first molding a core insert member, and then positioning end fittings at either end thereof to form a core assembly. The core assembly is next positioned in a mold cavity having a molding surface corresponding to the desired coil supporting surface of the coil form and plastic is then injected into the mold cavity to form a thin over-mold layer thereon to provide the desired winding support surface, following which the coil form is ejected from the mold cavity.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
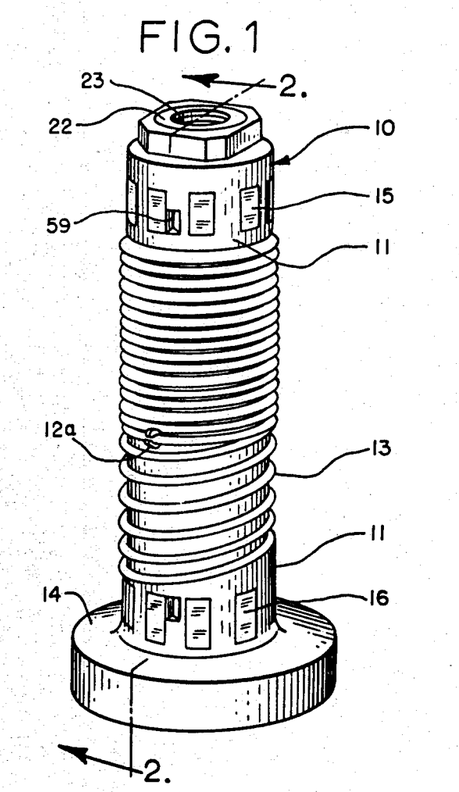
FIG. 1 is a perspective view of an inductance coil assembly incorporating a precision injection-molded coil form constructed in accordance with the present invention.

Referring now to the drawings, and particularly to FIG. 1, the invention is shown in conjunction with an inductance coil assembly 10 of a type used for electrically matching a coaxial feed line to a whip antenna. Basically, the coil assembly includes a central cylindrically-shaped coil form 11 on the circumferential surface of which a helical groove 12 (FIG. 2) is provided for receiving an electrical conductor 13 forming the inductance winding of the coil assembly. A flanged base portion 14 is provided at the bottom end of the coil assembly and a plurality of electrically conductive contact surfaces 15 and 16 are provided at the top and bottom ends of the assembly, respectively, for establishing electrical contact with and anchoring the ends of conductor 13.

Figure 2:
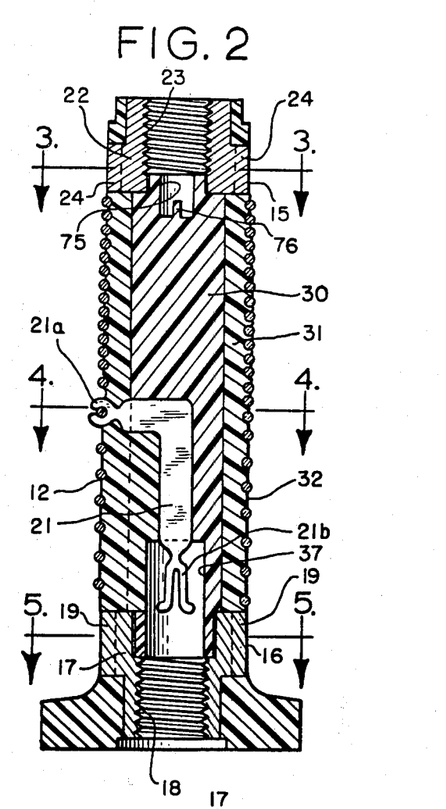
FIG. 2 is a cross-sectional view of the coil form taken along line 2—2 of FIG. 1.
Figures 3, 4:
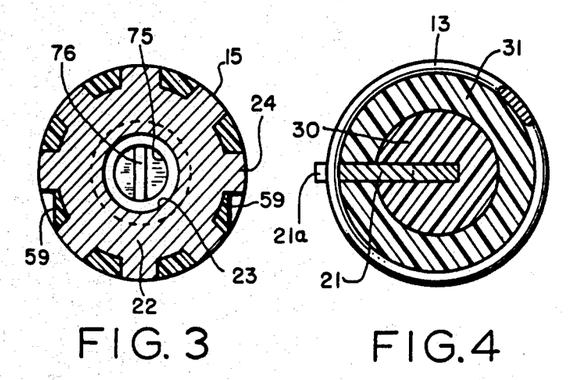
FIG. 3 is an enlarged cross-sectional view of the coil form taken along line 3—3 of FIG. 2.
FIG. 4 is an enlarged cross-sectional view of the coil form taken along line 4—4 of FIG. 2.
Figure 5:
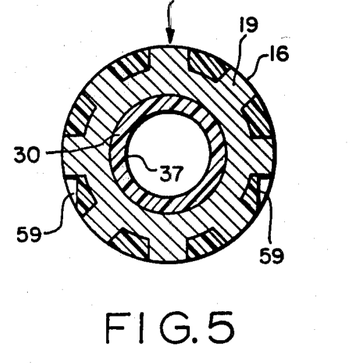
FIG. 5 is an enlarged cross-sectional view of the coil form taken along line 5—5 of FIG. 2.

Referring to FIG. 2, to facilitate mounting the coil assembly 10 to an underlying surface the bottom end of the coil form 11 includes an axially-aligned end fitting 17 formed of brass or other suitable material. This fitting includes a central bore 18 having a partially threaded portion for receiving a flanged collar or other fastener (not shown) extending through a mounting aperture in the underlying surface, and a plurality of tab portions 19 extending radially from a central sleeve-shaped body portion to assist in anchoring the fitting in place. Tab portions 19 form on their exposed ends the pads or contact surfaces 16 utilized to establish electrical connection with the bottom end of conductor 13. In the illustrated loading coil embodiment the pads 16 establish electrical contact between the coil and the underlying surface, representing electrical ground.

To establish electrical contact with the coil at an intermediate point or tap a flat strip-like contact member 21 in the form of an inverted "L" may be embedded into the coil form. The radially-extending end 21a of this contact member projects from the surface of the coil form and is notched to receive conductor 13. The axially-extending end 21b is provided with divergent fork-like ends suitable for slidably engaging the inner sleeve of a push-on type electrical connector (not shown). If desired the inside edges of these ends may be provided with thread engaging serrations to enable a threaded conductor to be attached to the contact member.

While the strip-like contact member shown promises to be the most economical form of contact member to produce in that it can be easily stamped from a sheet of appropriate metal, it is contemplated that the contact member may take other forms. For example, the contact member may be molded or machined, and may have other types of connector ends, either male and female to receive other types of connectors. Also, the connector end of terminal 21 may, whether formed in strip or molded form, include threads for engaging the threads of a complementarily threaded connector.

The top end of coil form 11 includes an axially-aligned end fitting 22 having a bore 23 for receiving in a threaded end portion thereof the threaded bottom end of the ship antenna. Like the bottom end fitting 17, this fitting may be formed of brass or other suitable material and may include a plurality of tab portions 24 which extend radially from a sleeve-shaped body portion to assist in anchoring the fitting in place. The exposed ends of the tab portions form the contact pads or surfaces 15 which establish electrical contact with conductor 13. In the illustrated embodiment a whip antenna (not shown) is threaded into bore 23 and these contact surfaces establish an electrical connection between the whip antenna and the top end of the winding.

Referring to FIGS. 2-5, coil form 11 includes a central core insert member 30 of generally cylindrical form, and a thin plastic over-layer 31 around the circumference of the core which forms the winding support surface 32 on which the winding support groove 12 is formed. The core member is dimensioned to be of just slightly smaller diameter than that of coil form 11 so that the diameter of the core member forms the greater part of the diameter of the complete coil form. Typically in a coil form approximately 0.75 inch in diameter, a difference of approximately 0.200 inch may exist between the diameter of the core member and the diameter of the completed coil form so that the thickness of the plastic over-mold layer will be approximately 0.100 inch or less. Providing a layer of this thickness over the relatively large pre-molded core avoids the dimensional variations which would result if the coil form were formed in a single molding operation since only the thin over-layer is subject to shrinkage during formation of the winding support surface, and not the entire core diameter.

Figure 6:
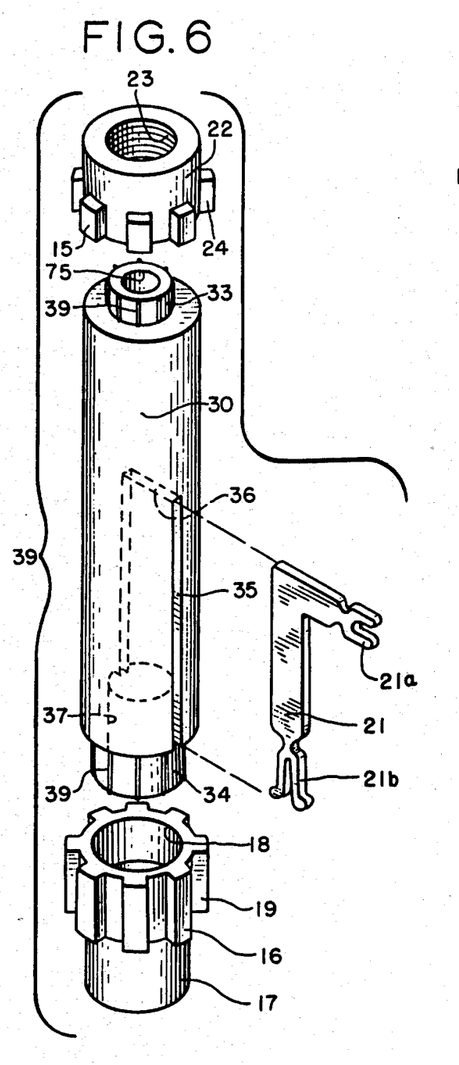
FIG. 6 is an exploded assembly view of the core, end fittings and contact member of the coil form.
Figure 7:
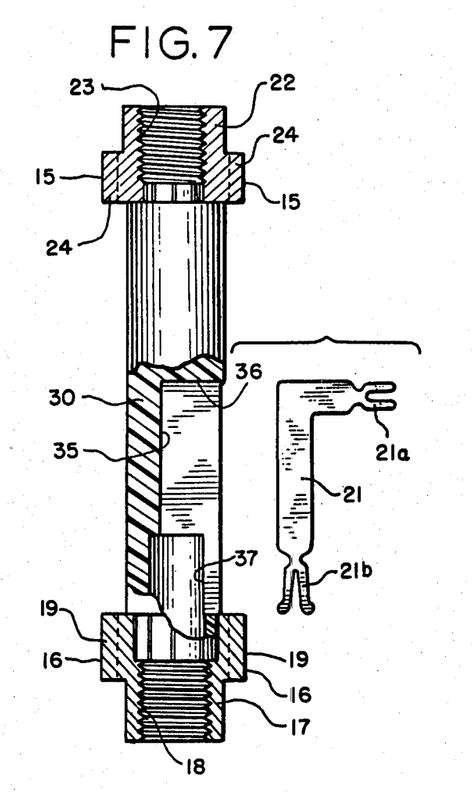
FIG. 7 is a side elevational view partially in cross-section showing the core and end fittings in an assembled state and the contact member being inserted.
Figure 8:
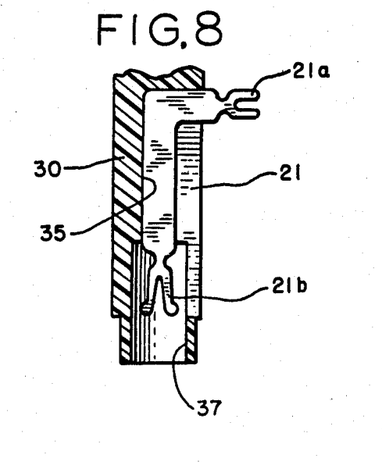
FIG. 8 is a side elevational view of a portion of the coil form showing the contact member in a seated position prior to application of the over-layer.

Referring to FIG. 6, core member 30 is generally cylindrical in form and includes axially-projecting shank portions 33 and 34 of reduced diameter at respective ends. To allow contact member 21 to be positioned within the core member prior to molding of the over-layer 31, core member 30 includes a longitudinally-extending channel 35 having a length and depth sufficient to allow the contact member 21 to be seated within the channel with its connector portion 21b aligned with the axis of the coil form. In assembly, contact member 21 is positioned as shown in FIG. 7 and then inserted into channel 35. Member 21 is then pushed inwardly until firmly seated within the channel. The end wall 36 of the channel forms an indexing surface which bears against the contact member when the latter is seated to maintain alignment. The core member 30 also includes an axially-aligned bore 37 in communication with channel 35. When contact member 21 is seated in channel 35 the connector portion 21b thereof extends into this bore to form in conjunction therewith electrical connecting means for the coil assembly winding.

To provide a tight but rotatable engagement between end fittings 17 and 22 and core member 30 the circumferential surfaces of shank portions 33 and 34 are preferably provided with a plurality of longitudinally-extending splines 39, and bores 18 and 23 are dimensioned to have inside diameters slightly smaller than the effective outside diameters of the shank portions as established by the splines. This arrangement allows for subsequent repositioning or alignment of the end fittings, while maintaining a tight fit during assembly.

Figure 9:
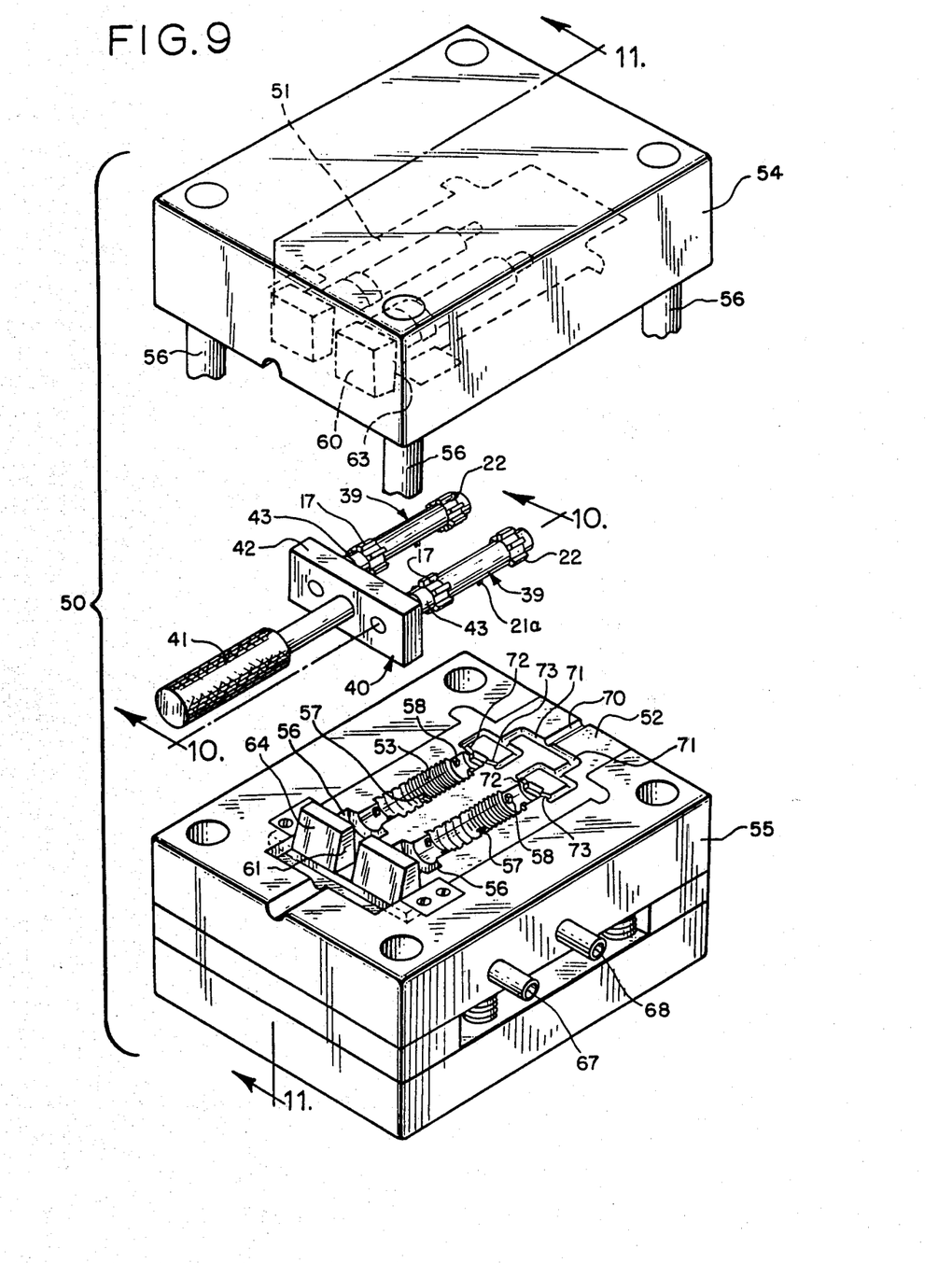
FIG. 9 is an exploded perspective view of the mold and mold loading jig utilized in molding the coil form showing the positioning of the loading jig in the mold cavity and the placement of cores thereon.
Figure 10:
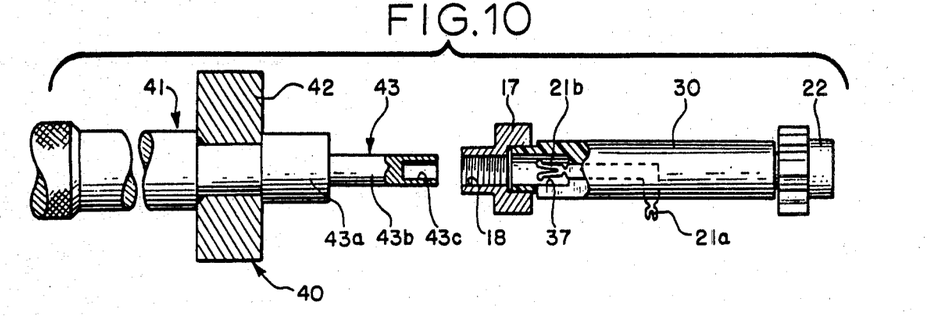
FIG. 10 is an enlarged partially exploded cross-sectional view taken along lines 10—10 of FIG. 9.
Figure 11:
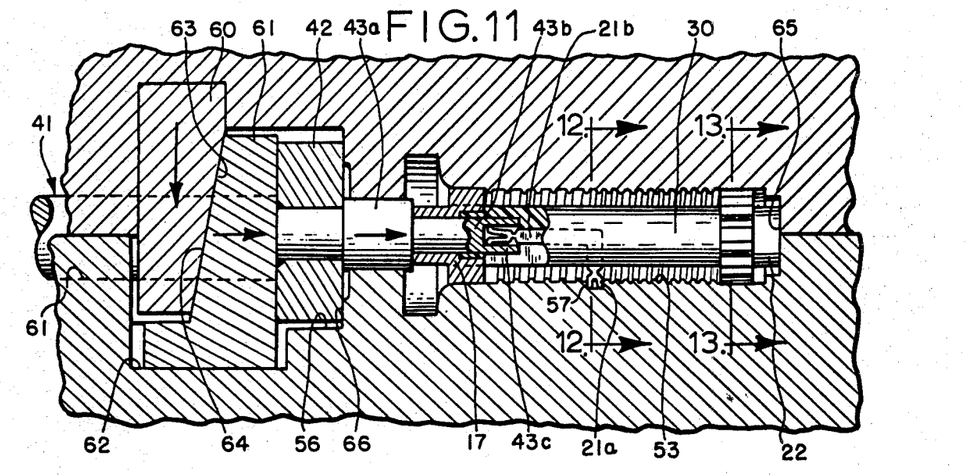
FIG. 11 is an enlarged cross-sectional view taken along lines 11—11 of FIG. 9.

End fittings 17 and 22 form, when fitted onto core member 30, as shown in FIG. 7, a core assembly 39 to which the over-layer 31 can be applied in a single final molding operation. Referring to FIG. 9, prior to this final molding operation two such core assemblies are, in accordance with one aspect of the invention, inserted side-by-side in spaced parallel-axis relationship on a mold loading jig 40. The loading jig includes a handle 41 and a base 42 from which a pair of spaced-apart parallel-axis core assembly support members 43 extend in an opposite direction from the handle for supporting respective ones of the core assemblies. As shown in FIG. 10, each of these support members 43 includes a first portion 43a of relatively large diameter which abuts end fitting 17, and a second portion 43b of reduced diameter which extends through bore 18 to abut the distal end of bore 37 in core member 30. An axially-aligned bore 43c in the projecting end of support member 43 is provided to receive the axially-projecting connector portion 21b of the previously seated contact member 21.

Figure 12:
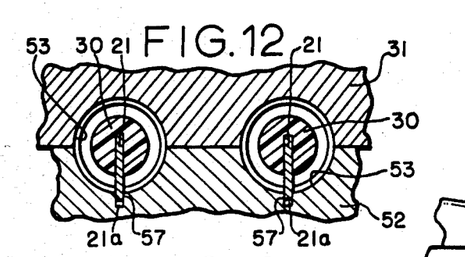
FIG. 12 is an enlarged cross-sectional view taken along lines 12—12 of FIG. 11.

Referring to FIG. 9, the final molding process is carried out in molding apparatus 50 which may, in accordance with conventional practice, include coacting upper and lower cavity blocks 51 and 52 each containing a half section of a precision-machined cavity 53 formed when the two cavity blocks are joined. The cavity blocks 51 and 52 are conventionally mounted in respective ones of mold frame assemblies 54 and 55, which are maintained in alignment by means of header pins 56. Initially, the two mold frames 54 and 55 are opened as shown in FIG. 9, exposing the cavity blocks 51 and 52 to facilitate loading the core assemblies 39 within cavity 53. In accordance with one aspect of the invention, this is conveniently accomplished by seating the base 41 of the jig in an appropriately dimensioned recess 56 in the bottom cavity block 52. A recess 57 is provided at the bottom of cavity half-section 53 to accommodate the projecting end 21a of contact member 21, as shown in FIG. 12. Thus, with a single loading operation two core assemblies are positioned in cavity 53 for application of the precision over-molded layer.

Figure 13:
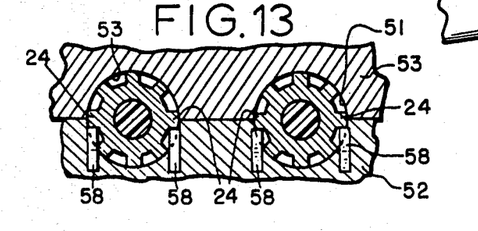
FIG. 13 is an enlarged cross-sectional view taken along lines 13—13 of FIG. 11.

As the cavity blocks 51 and 52 are brought together the radially-projecting tab portions of end fittings 17 and 22 are brought into exact rotational alignment with respect to each other and core member 30 by means of camming surfaces 58 provided in the cavity half-sections. As shown in FIG. 13, these camming surfaces bear against the most nearly aligned tab portion and cause the end fittings to rotate about the core axis until they are in exact alignment as the half-sections become fully mated. In the subsequent molding operation notches 59 (FIGS. 1, 3 and 5) are formed in the over-layer as a result of the presence of the camming surfaces.

In accordance with another aspect of the invention, compression means in the form of two coacting actuator blocks 60 and 61 are provided for compressing the core assemblies on jig 40 prior to application of the over-layer. Actuator block 61 is mounted in a recess 62 for limited reciprocation in cavity block 52 along the axis of core assemblies 39. The base 41 of jig 40 is similarly mounted in abutment to actuator block 61, so that as the latter moves along the axis of the core assemblies the base 42 and retaining members 43 of the jig must do likewise. Actuator block 60 includes a beveled surface 63 which bears against a complementarily beveled surface 64 on block 61 when the cavity blocks are brought together so that block 61 is forcibly displaced toward the core assemblies. This causes base 42 of jig 40 to axially compress end fittings 17 and 22 and core member 30 against the opposing wall 65 of cavity 53 until base 41 comes into abutment with a precision wall surface 66 in cavity 53. As a result of this compression the end fittings and core member are, in accordance with the invention, compressed from an initial over-length condition to a predetermined desired axial dimension with a high degree of precision. In practice core member 30 is purposely formed over length so that compression to an absolute lesser dimension will always take place notwithstanding anticipated production tolerance variations. In the illustrated 0.750 diameter coil form, variations in core length of over ±0.015 inch are eliminated by the compression process and a core length having a variation of only ±0.001 inch is achieved.

Since no additional actuating or control components are required for the compressing the core assembly or accomplishing the described alignment functions, the final molding operation is labor efficient and well suited for high volume requirements. The cavity blocks 51 and 52 and mold frames 54 and 55 may, except for the afore-described features, be conventional in construction and design. The upper mold frame may be raised and lowered by conventional hydraulic means (not shown) which are well known to the art. The lower mold frame may be provided with water circulation means including inlet and outlet ports 67 and 68 for maintaining the walls of the mold cavity at a desired temperature.

After the cavity blocks 51 and 52 have been brought together to form cavity 53 liquid plastic is injected under high pressure from a communicating pressure nozzle (not shown) through an inlet port or sprue 70 formed between the cavity blocks. A network of passageways or runners 71 conveys the liquid plastic in equal amounts and with equal pressures to a pair of inlet passageways or gates 72 and 73 associated with each cavity. In accordance with another aspect of the invention, these gates are positioned at one end of the cavities and at opposite sides of the seated core assemblies, thereby exerting a balanced force on the assemblies. This prevents the core from becoming deformed under the intense pressures developed within cavity 53 during injection of the plastic.

While two opposing gates are shown, it will be appreciated that the same result can be obtained by symmetrically positioning a greater number of gates about the circumference of cavity 53. This would however have the disadvantage of complicating the design of the cavity blocks.

The reduced diameter portion 43b of support member 43 serves, in addition to supporting the core assembly 40, to prevent collapse of the walls of end fitting 17 under the extreme pressure supplied by the molten plastic. To this end, the outside diameter of portion 43b is preferably equal to the minimum inside diameter allowable for the threaded portion of bore 18. With this arrangement, any attempt of the walls of end fitting 17 to deform will be prevented by the solid plug portion 43b inserted therein. In practice, for the 0.750 inch diameter coil form it has been found that forming the support member 43b with an outside diameter 0.0005 to 0.0003 inch less than the inside diameter of the threaded portion of bore 18 provides a satisfactory protection against deformation of end fitting 17 while allowing the support member 43 to be readily inserted and withdrawn.

Typically, in forming a coil form having a diameter of approximately 0.750 inch diameter and a length of approximately 4 inches plastic is injected in fluid form with a pressure in excess of 9000 psi. This results in the outer surface 32 of overmold layer 31 having a tolerance of ±0.001 inch with a layer thickness of approximately 0.100 inch. The molds are preferably heated to a temperature of approximately 180° F. and the plastic melt is preferably heated to a temperature of aproximately 470° F.

Following the molding operation, the mold frames are separated and conventional ejection means, in the form of conventional hydraulically or pneumatically actuated ejector rods (not shown) eject the now completed coil form from the mold. The various timing and control functions required in the operation are accomplished automatically so that the entire operation requires minimal attention from an operator.

Figure 14:
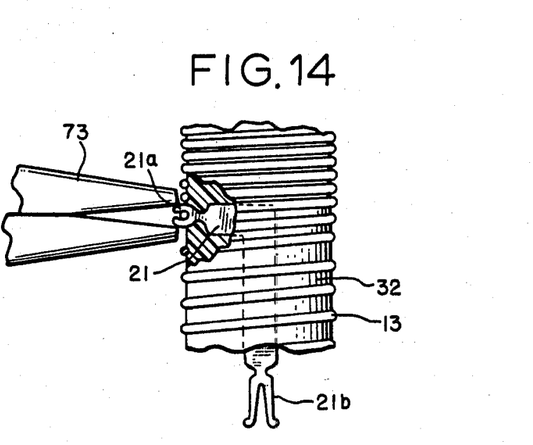
FIG. 14 is an enlarged perspective view partially broken away to illustrate the connection between the winding and the contact member of the coil assembly.

Once the coil form assemblies have been completed, the coil winding 13 is laid into the grooves molded into the outer surfaces 32 of each. As the winding passes over contact member 21 and between the blades of the projecting spade-like end 21a thereof, the spade ends are crimped by means of a pliers 73, as shown in FIG. 14, or by other appropriate manual or automatic means. Thus, a tap is established on the winding which could otherwise only be established by means of intersecting bores in the core member and a connecting wire. Contact member 21 obviates the need for additional wiring or passageways, thus making the coil assembly more economical to manufacture and better suited for high volume production.

The connector end 21b of contact member 21 forms in conjunction with bore 37 and the threaded portion of bore 18 a two-conductor electrical connector for connection to a mating sleeve-type connector. This arrangement is particularly useful where the coil form is to be mounted on the fender of a car or other location where ground and source connections must be simultaneously established. In this instance it is contemplated that a single flanged collar (not shown) extending through an underlying mounting aperture could be turned onto the threads of bore 18 to mount the coil form on a flat surface, and a conventional sleeve-type connector would then be pushed upwardly through a passageway in the center of the collar to establish contact 21. With this arrangement the dual functions of establishing an electrical and mechanical connection with the coil form are simultaneously accomplished.

Figure 15A:
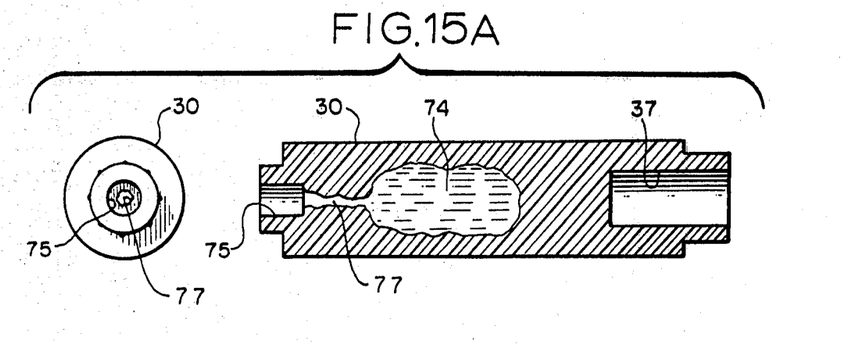
FIGS. 15A and 15B are diagrammatic views useful in understanding a phenomenon occurring during molding of the core member.

In forming core insert member 30 a problem arises from uneven cooling of the plastic melt within the core mold. As illustrated in FIG. 15A, the plastic at the center of the core tends to cool more slowly than the plastic nearer the surface of the core, forming a hot spot 74 within the core. This sets up stresses within the core which cause the plastic at the antenna end of the core, which has a mass-reducing bore 75 and is potentially the slowest to cure to be drawn toward the hot center portion. This leaves voids and air bubbles in the path or flow 77, forming what is commonly termed a suck-in.

Figure 15B:
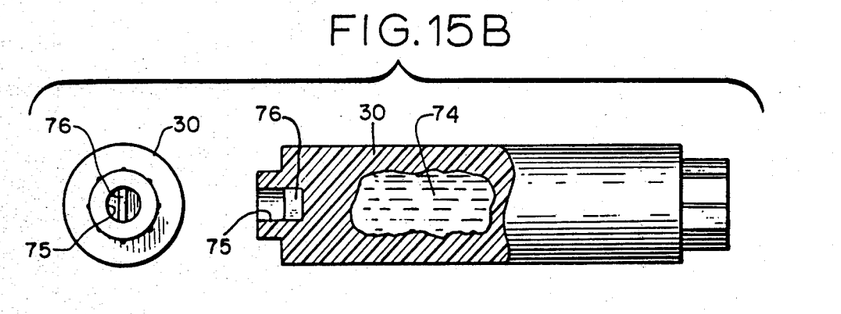

In accordance with the invention, this phenomenon is avoided by molding a diametrically-extending bridge or tab member 76 across bore 75, as shown in FIG. 15B. This bridge is rapidly cooled following the injection process because of its relatively large surface area, and being then harder than the surrounding still-curing plastic, serves to prevent suck-in. The bridge member, which may be in the form of a tab 0.050 inch thick and 0.150 to 0.200 inch high in the 0.750 inch core diameter embodiment illustrated, may take on other forms where appropriate, the only requirements being proximity to the inside end of the bore and a large surface area for rapid cooling.

Figure 16:
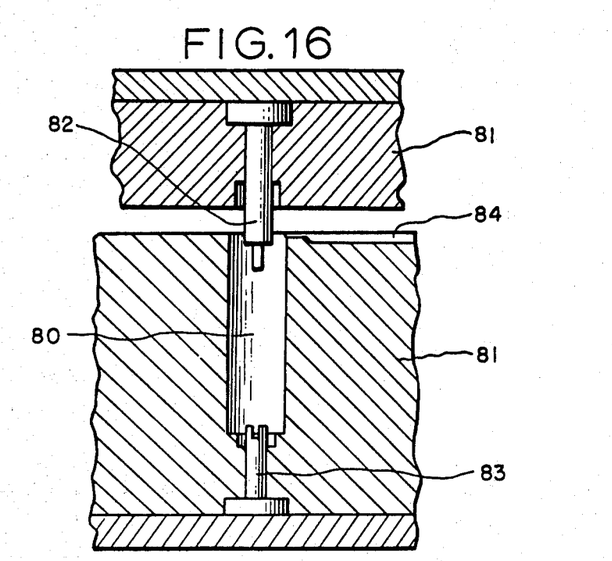
FIG. 16 is a cross-sectional diagrammatic view of an injection mold utilized in molding the core insert member of the coil form.

Referring to FIG. 16, core member 30 may be molded within a cavity 80 formed by conventional cavity blocks 81. The upper block includes a conventional mold core 82 which forms bore 37, and a bottom mold core 83 which forms bore 75. After the cavity blocks have been joined liquid plastic is admitted through a sprue 84 to mold the coil form in a manner well known to the art. Additional features of the core, such as channel 35, are also formed at this time by appropriate mold cores, which have not been shown for the sake of clarity.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. The method of molding an elongated core member including an elongated bore-shaped recess in one end thereof and a solid elongated portion extending from the interior end of said recess such such interior end of said recess is subject to suck-in during post-molding cooling of the core member, said method comprising the steps of:

forming an elongated mold cavity corresponding to the surface of the core member;

positioning a mold core to extend into said cavity a distance substantially less than the length of said cavity to form the bore-shaped recess, a substantial length of said cavity beyond the end of said mold core remaining substantially open to form said elongated solid portion;

providing at least one notch at the end of the mold core for forming a bridge portion fully across the interior end of the recess;

injecting plastic into the cavity to form the core member removing the completed core member from the mold cavity.

2. A method in accordance with claim 1 wherein said bridge portion is relatively thin upstanding tab extending between the sidewalls of said recess.

3. A method in accordance with claim 1 in which said mold cavity is generally cylindrical and said mold core is positioned along the axis of said mold cavity.

4. A method in accordance with claim 1 in which said mold core is generally cylindrical, and said notch extends diametrically across said mold core to form a bridge portion which extends diametrically across the end of the recess.

5. A one-piece molded plastic core member including:

an elongated body portion comprising an elongated body portion comprising an elongated bore-shaped recess of substantially less extent than said body portion in one end thereof;

a solid elongated portion of said body portion extending axially from the interior end of said recess; and means including a bridge portion extending fully across said recess at said interior end thereof for preventing suck-in at said interior end during post-molding cooling of the core member.

6. A core member in accordance with claim 5 in which said body portion is generally cylindrical and said bore-shaped recess extends along the axis of said cylindrical core member.

7. A core member in accordance with claim 5 in which said bore-shaped recess is cylindrical and said bridge portion extends diametrically across the end of said recess.

8. A core member in accordance with claim 5 wherein said bridge portion is a relatively thin upstanding tab extending between the sidewalls of said recess.

9. Apparatus for molding a core member having an elongated body portion and at least one elongated bore-shaped recess in one end thereof, said core member having an elongated solid, relatively slower-cooling central portion extending from the interior end of said recess, said apparatus comprising:

a mold defining an elongated cavity corresponding to the body portion;

a mold core extensible into said cavity a distance less than the length of said cavity to form the bore-shaped recess, a substantial length of said cavity beyond the end of said mold core being substantially open to form the central solid portion, and means including a notch in the end of said mold core for forming a bridge portion extending fully across the inside end of said recess to prevent suck-in upon post-molding cooling of said central solid portion.

10. Apparatus in accordance with claim 9 wherein said notch is a relatively thin deep slot for forming a fast-cooling, relatively thin upstanding tab portion.

* * * * *